(12) United States Patent
Butz

(10) Patent No.: US 9,355,346 B2
(45) Date of Patent: May 31, 2016

(54) WEARING PART WITH A WEAR INDICATOR AND SYSTEM FOR WEAR TESTING

(71) Applicant: MAN TRUCK & BUS AG, Munich (DE)

(72) Inventor: Matthias Butz, Munich (DE)

(73) Assignee: MAN Truck & Bus AG, Munich (DE)

( * ) Notice: Subject to any disclaimer, the term of this patent is extended or adjusted under 35 U.S.C. 154(b) by 0 days.

(21) Appl. No.: 14/662,472

(22) Filed: Mar. 19, 2015

(65) Prior Publication Data

US 2015/0269468 A1 Sep. 24, 2015

(30) Foreign Application Priority Data

Mar. 19, 2014 (DE) .......................... 10 2014 003 985

(51) Int. Cl.
| | |
|---|---|
| *G06K 7/10* | (2006.01) |
| *G06K 19/06* | (2006.01) |
| *B60C 11/24* | (2006.01) |
| *F16D 66/02* | (2006.01) |
| *F16D 65/12* | (2006.01) |
| *F16D 65/02* | (2006.01) |

(52) U.S. Cl.
CPC .......... *G06K 19/06159* (2013.01); *B60C 11/24* (2013.01); *F16D 65/12* (2013.01); *F16D 65/127* (2013.01); *F16D 66/02* (2013.01); *G06K 19/06028* (2013.01); *G06K 19/06037* (2013.01); *F16D 2065/1332* (2013.01)

(58) Field of Classification Search
CPC .......... G06K 7/10; G06K 9/18; G06K 19/00; G06K 19/06; G06F 17/00; G06F 7/00
USPC .................... 235/375, 494, 487, 376, 462.11, 235/462.09; 152/154.2, 209.1, 209.28
See application file for complete search history.

(56) References Cited

U.S. PATENT DOCUMENTS

| | | | |
|---|---|---|---|
| 2,102,784 A | 12/1937 | Bridges | |
| 3,578,055 A | 5/1971 | French | |
| 3,929,179 A | 12/1975 | Hines | |
| H1283 H | * 2/1994 | Porto | .................... B60C 13/001 |
| | | | 152/154.2 |
| 6,220,199 B1 | 4/2001 | Williams | |
| 6,279,698 B1 | 8/2001 | Oberti | |
| 6,289,958 B1 | 9/2001 | Dheur et al. | |
| 6,523,586 B1 | 2/2003 | Eromaeki et al. | |
| 7,050,017 B2 | 5/2006 | King et al. | |
| 7,604,029 B2 | 10/2009 | Myatt | |
| 7,670,123 B2 | 3/2010 | Cuny et al. | |
| 8,162,014 B2 | 4/2012 | Mosko et al. | |
| 8,403,012 B2 | 3/2013 | Harvey et al. | |
| 2002/0036039 A1 | 3/2002 | Shimura | |

(Continued)

FOREIGN PATENT DOCUMENTS

| | | |
|---|---|---|
| DE | 1803483 | 5/1969 |
| DE | 2457334 C3 | 10/1980 |

(Continued)

*Primary Examiner* — Edwyn Labaze
(74) *Attorney, Agent, or Firm* — Laurence A. Greenberg; Werner H. Stemer; Ralph E. Locher

(57) ABSTRACT

A wearing part, preferably for a vehicle, contains a wear indicator whose appearance changes depending on a wear condition of the wearing part. The wear indicator contains a multidimensional pattern that is disposed on the wearing part such that different levels of the pattern are exposed depending on the wear condition.

16 Claims, 11 Drawing Sheets

(56) References Cited

U.S. PATENT DOCUMENTS

| | | | |
|---|---|---|---|
| 2006/0273148 A1* | 12/2006 | Karstens | B60C 11/24 235/375 |
| 2007/0144369 A1* | 6/2007 | Cousin | B41F 13/03 101/218 |
| 2007/0158436 A1* | 7/2007 | Ichikawa | B60C 13/001 235/492 |
| 2008/0053588 A1* | 3/2008 | Tsuruta | B60C 11/00 152/524 |
| 2010/0030490 A1* | 2/2010 | Wright | F16D 66/02 702/34 |
| 2011/0214801 A1* | 9/2011 | Lindsay | B29D 30/54 156/96 |
| 2012/0010776 A1 | 1/2012 | Paturle | |
| 2012/0013458 A1* | 1/2012 | Kanenari | B60C 23/0471 340/447 |
| 2012/0266649 A1 | 10/2012 | Paturle et al. | |
| 2014/0319209 A1* | 10/2014 | Beadles | G06Q 30/0207 235/375 |

FOREIGN PATENT DOCUMENTS

| | | |
|---|---|---|
| DE | 3627833 A1 | 2/1988 |
| DE | 4002695 A1 | 8/1991 |
| DE | 102010037382 A1 | 3/2012 |
| DE | 102011050911 A1 | 12/2012 |
| EP | 0985841 A1 | 3/2000 |
| EP | 1063442 A2 | 12/2000 |
| EP | 1066991 A2 | 1/2001 |
| EP | 1630008 A1 | 3/2006 |
| EP | 1798071 A2 | 6/2007 |
| EP | 1705034 B9 | 7/2010 |
| EP | 2455236 A1 | 5/2012 |
| FR | 2917668 A1 | 12/2008 |
| JP | 2009107484 A | 5/2009 |
| WO | 0112735 A1 | 2/2001 |
| WO | 2007102790 A2 | 9/2007 |
| WO | 2012031591 A2 | 3/2012 |
| WO | 2012167983 A1 | 12/2012 |

* cited by examiner

WEARING PART WITH A WEAR INDICATOR AND SYSTEM FOR WEAR TESTING

CROSS-REFERENCE TO RELATED APPLICATION

This application claims the priority, under 35 U.S.C. §119, of German application DE 10 2014 003 985.4, filed Mar. 19, 2014; the prior application is herewith incorporated by reference in its entirety.

BACKGROUND OF THE INVENTION

Field of the Invention

The invention relates to a wearing part, preferably a wearing part for a vehicle, with a wear indicator, whose appearance changes depending on a wear condition of the wearing part. The invention also relates to a system for wear testing.

An application of the invention highlighted by way of example relates to a tire as an example of the wearing part that is fitted with the wear indicator according to the invention. It is known from practice that the wear condition of a tire has to be checked regularly in order to monitor the functionality of the tire and in order to meet legal requirements. In the case of commercial vehicles, after reaching the wear limit tires can be recut up to twice and can be retreaded once. In order to estimate when replacement or renewal of the tire or profile is necessary, wear characteristics and wear predictions are used.

From the prior art for example methods are known that estimate the wear condition of the tire from the driving behavior of the driver. Furthermore, from published, European patent application EP 1 798 071 A3 (corresponding to U.S. Pat. No. 7,604,029), U.S. Pat. Nos. 6,289,958 B1 and 7,050,017 B2 methods are known with which sensors that measure the current condition of the tire are machined into the tire.

Moreover, wear characteristics are also known that either give audible (see published, non-prosecuted German patent application DE 18 03 483 A1 (corresponding to U.S. Pat. No. 3,578,055), U.S. patent publication No. 2012/0010776 A1, and U.S. patent publication No. 2012/0266649 A1) or visual feedback and are then analyzed by the driver himself or by an electronic system. From the prior art visual wear characteristics are known that only show the final wear condition by color or with final wear condition reference shapes (see U.S. Pat. No. 6,220,199 B1, German patent DE 24 57 334 C3 (corresponding to U.S. Pat. No. 3,929,179)) or that show the progress of the wear by their continuous change of shape (published, non-prosecuted German patent application DE 36 27 833 A1, U.S. Pat. No. 8,162,014 B2, European patent EP 1 705 034 B9, international patent disclosure WO 2001/0012735 A1, and U.S. Pat. No. 2,102,784 A1).

The known approaches have a series of disadvantages. The aforementioned estimation methods, which calculate wear from the driving behavior, cannot take into account all external conditions and are therefore inaccurate. The automatic storage and analysis of the wear conditions can only be achieved with integrated tire sensors or optical systems. Sensors that are machined into the tire have the disadvantage, however, that they are expensive and must be implemented robustly in order to enable retreading or recutting.

The aforementioned systems, which can reliably detect and analyze an optical feature, require high quality and are thus also very costly. A depression or elevation in a tire can also only be detected with difficulty using simple optical systems. Wear characteristics in the form of pockets can also fill with dirt, sludge or other impurities and make the measurement and detection of the feature additionally difficult. Because of the dark color of the tire, the contrast between the tread and wear characteristic itself is too low without fouling to enable the wear characteristic to be detected reliably. In the case of the method known from the prior art, therefore, measurement errors cannot be excluded.

SUMMARY OF THE INVENTION

It is thus the object of the invention to provide a wearing part containing an improved wear indicator, with which disadvantages of conventional techniques for wear testing can be avoided. The object of the invention is especially to provide a wear indicator with which the wear condition can be reliably detected and analyzed. It is a further object of the invention to provide a system for wear testing that enables rapid and reliable detection and monitoring of the wear condition of the wearing part.

The objects are achieved by a wearing part with a wear indicator according to the features of the independent claims. Advantageous embodiments and applications of the invention are the subject matter of the dependent claims and are explained in detail in the following description with partial reference to the figures.

The wearing part according to the invention for a vehicle contains a wear indicator in accordance with the prior art whose appearance changes depending on a wear condition of the wearing part.

According to general aspects of the invention, the wear indicator contains a multidimensional pattern that is disposed on the wearing part so that different levels of the pattern are exposed depending on the wear condition.

A multidimensional pattern within the scope of the invention contains a plurality of different (wear) levels disposed on top of each other in the direction of wear, each containing a pattern that is associated with a wear condition. In the case of increasing wear of the wearing part, different levels of the multidimensional pattern are successively eroded depending on wear, so that different patterns in a two-dimensional surface can be visible depending on the wear condition. The number of patterns disposed on top of each other in the direction of wear is thereby not limited to a defined number. The higher the number of such patterns disposed on top of each other, the larger the number of different wear conditions that can be determined.

The multidimensional pattern preferably changes discretely in the direction of wear, such that in any wear condition it can be positively determined which of the patterns that are disposed one above the other is exposed. In the case of discrete changing of the pattern, at least part of the pattern changes discretely with decreasing wear levels, i.e. not continuously. The wear condition associated with the determined exposed pattern can be determined reliably using the discrete change.

According to an advantageous exemplary embodiment, each exposed level of the pattern can be implemented so as to be optoelectronically readable. The pattern can e.g. be a 2D code, preferably a QR® code, or a 1D code, preferably a barcode, as described below in more detail. This enables rapid readout of the wear condition with a suitable optical reader.

Each exposed level of the pattern can encode data that are indicative of the respective wear condition. Data relating to the associated wear condition can thus be encoded in the different levels of the three-dimensional pattern, e.g. in binary form using a QR® code or as characters, encoded by a barcode. This enables a digital analysis and as a result a smaller error rate than with analog analysis methods. A further advantage is that the data can describe the wear condition accurately, e.g. in the form of a percentage value.

For example, the different levels of the three-dimensional pattern can contain a one-dimensional or two-dimensional machine-readable code.

According to a preferred exemplary embodiment, the different levels of the multidimensional pattern each represent a 2D code, preferably a QR® code. According to the embodiment version, the three-dimensional pattern is thus implemented as a 2D code, e.g. as a QR® code, which changes its shape or its appearance in the direction of wear, so that the information content of the 2D code changes with decreasing wear levels. The wear indicator can thus consist of a plurality of two-dimensional QR® codes disposed one above the other in the embodiment version with QR® codes. The QR® code according to the embodiment version can thus be referred to as a three-dimensional QR® code.

The wear indicator with the three-dimensional QR® code is disposed on the wearing part such that the individual levels of the QR® code are worn away successively because of the wear, and depending on the wear condition a respective two-dimensional QR® code is always visible with binary encoded information or data relating to the current wear condition. The QR® code can be a Micro-QR® code or an iQR® code.

In the case of another version, instead of a 2D code or a QR® code, a conventional 1D code, e.g. a barcode, is used, so that the different levels of the pattern each represents a barcode.

A particular advantage of the use of the multidimensional 2D code or 1D code according to the invention is that each two-dimensional 2D code or 1D code exposed in a wear condition can be read optoelectronically. For this purpose, in particular a conventional end user mobile device can be used, e.g. a smartphone or tablet computer, which is configured by suitable application software for reading 2D code or 1D code or QR code or barcode.

In the case of one advantageous version of the above-mentioned embodiments, a shape of the 2D code and/or of the 1D code can change in the direction of wear such that the number and/or shape and/or position and/or color of information carriers decreases. In the case of a 2D code the information carriers are the black areas and in the case of a barcode the information carriers are the black bars in relation to the white areas or the white bars. This enables particularly simple manufacture of the three-dimensional 2D code or 1D code.

Furthermore the pattern can be configured such that other, especially wear condition independent, properties of the wearing part are additionally encoded. The wear condition independent properties can e.g. be a statement relating to the manufacturer, the date of manufacture or the type of the wearing part. In particular, in the case of a tire the wear condition independent properties can also contain a statement as to whether and/or how often the tire has been recut or retreaded.

A particular advantage of the wear indicator according to the invention is that by use of the multidimensional pattern, e.g. of the three-dimensional or multi-layer QR® code, both wear condition-dependent and also wear condition-independent data can be encoded that enable improved analysis of the wear condition.

In the case of one advantageous version of the embodiment, the wear indicator is configured such that the wear condition-independent properties of the wearing part are encoded in a region that does not change in the direction of wear. According to the embodiment version, the arrangement of those information carriers, e.g. of the QR® code or of the barcode, that encode the wear condition-independent properties of the wearing part, can thus be the same in any level.

It has already been explained above that in the case of an application of the invention that was highlighted by way of example, the wearing part can be a tire on which the wear indicator is incorporated in the tread of the tire.

If the multidimensional pattern in the tire is implemented as a multi-layer 2D code, the black areas of the 2D code can be formed by tire material and an intermediate space between the black areas of the 2D code can be implemented as a pocket and/or as an elevation.

In a comparable manner, in the case of the embodiment version with a multi-layer 1D code, e.g. a barcode, the black bars of the 1D code can be formed by tire material and an intermediate space between the black bars of the 1D code can be implemented as a pocket and/or an elevation.

In other words, the information carriers thus consist of the tire material. However, it is emphasized that an inversion of the above-mentioned embodiment version is also possible, in which case the intermediate space of the information carriers is formed by the tire material.

Furthermore, within the scope of the invention it is possible that the wear characteristic is manufactured as a separately made component and subsequently introduced into an existing pocket of the wearing part.

In order to increase the legibility of the 2D code or generally of the pattern, it is advantageous to provide the intermediate space of the information carriers with a contrast means, e.g. by filling with a contrast material, wherein a wear property of the contrast means or of the contrast material corresponds to a wear property of the tire material. The wear property of the contrast material can correspond to the wear property of the tire material of the tread. In the case of a particularly simple embodiment version, the intermediate space between the information carriers can be filled, e.g. with white rubber.

According to another advantageous version, the contrast material can be implemented to be fluorescent in order to ensure legibility even in a poor lighting environment. This is particularly advantageous in the case of tires that are not steerable and are disposed in narrow wheel housings.

Besides the aforementioned application of the wear indicator according to the invention in the case of a tire that was highlighted by way of example, another preferred application of the invention contains the application of the wear indicator to a brake disk. According to the version, the wearing part is thus a brake disk and the wear indicator is introduced into a braking surface, also referred to as a friction surface, of the brake disk.

For example, the multidimensional pattern can be formed by a plurality of juxtaposed pockets or elevations that are introduced into the friction surface of the brake disk. In this case a multidimensional pattern again means that the pattern extends across a surface perpendicular to the wear direction and in the direction of wear. Furthermore, the number, shape and/or position of the pockets or elevations that are visible in plan view on the friction surface can change discretely depending on the wear of the friction surface.

Changes of the contour of the wear indicator can thus be determined depending on the wear condition, and the wear condition can be determined from the number, shape and/or position of the pockets and/or elevations visible on the brake disk in plan view. According to another version, the pattern can again be in the form of a multi-layer QR® code or a multi-layer barcode that is incorporated in the brake disk. The term "multi-layer" means in this case and in connection with the following embodiments that the pattern, e.g. the code, contains a plurality of levels disposed one above the other in the direction of wear, in which the pattern is structured differently. The term of a layer is thus not necessarily to be taken to mean a materially closed unit of material in this connection.

Another aspect of the invention relates to a system for wear testing. The system contains a wearing part with a wear indicator according to any one of the preceding aspects. The system also contains a multifunctionally usable end user mobile device, which is configured by application software to optoelectronically detect each visible planar pattern of the wear indicator, e.g. a visible 1D code or 2D code of the pattern, and to detect a wear condition of the wearing part on the basis of the detected three-dimensional pattern.

The multifunctionally usable end user mobile device can e.g. be a conventional handheld mobile computer, e.g. a smartphone or a tablet computer. In these cases the application software can be a so-called mobile app for the smartphone or the tablet computer. With the end user mobile device the wear indicator can be read with the camera of the device in the case of any pre-driving check or in the case of need by the driver.

The mobile device can be programmatically configured in this case such that in addition to the read wear condition-dependent information and the wear condition-independent information as previously described, data relating to the current location and the date can also be automatically signalled to a central point, e.g. the haulier. In such a system it can further be ensured that a pre-driving check is regularly carried out by the driver. Furthermore, it is possible to determine the remaining life of the tire by means of frequent assessments in order to plan a future tire change.

A particular advantage of the invention is that the wear indicators indicated are machine-readable and in particular can be read by means of a conventional smartphone, which can be suitably configured by application software. The read wear data can also be sent by telematics software to a central computer for storage, whereby the progress of the wear can be documented and predicted.

Another aspect of the invention relates to a vehicle, especially a commercial vehicle, with a wearing part according to any one of the preceding aspects.

Other features which are considered as characteristic for the invention are set forth in the appended claims.

Although the invention is illustrated and described herein as embodied in a wearing part with a wear indicator and a system for wear testing, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
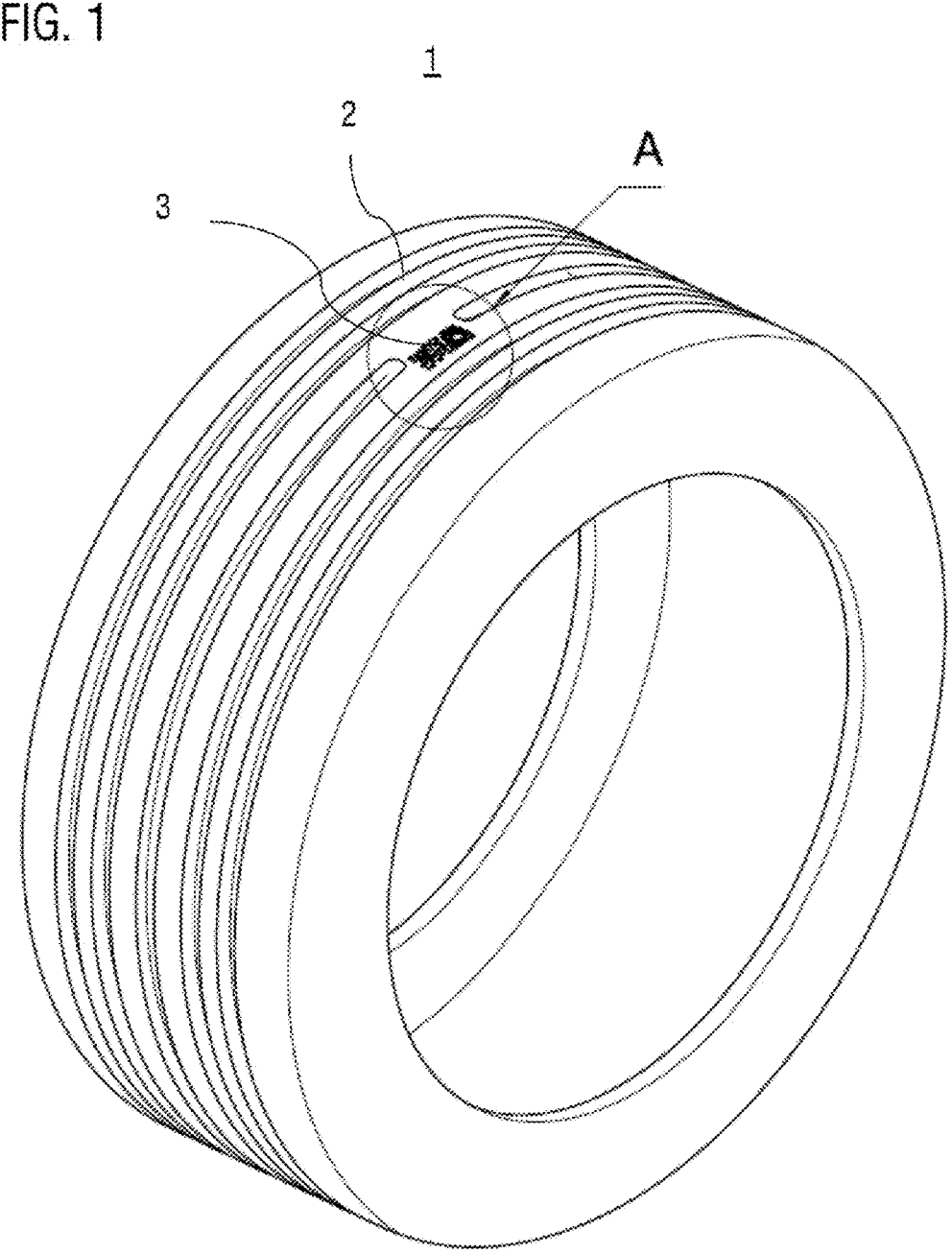
FIG. 1 is a diagrammatic, perspective view of a tire with an incorporated QR® code as a wear indicator according to a first exemplary embodiment of the invention.

Referring now to the figures of the drawings in detail and first, particularly to FIG. 1 thereof, there is shown a perspective view of a vehicle tire 1 in which a wear indicator in the form of a multi-layer QR® code 3 is incorporated in a tread 2. The QR® code is implemented as an iQR code, which is especially suitable for cylindrical surfaces.

Figure 2A:
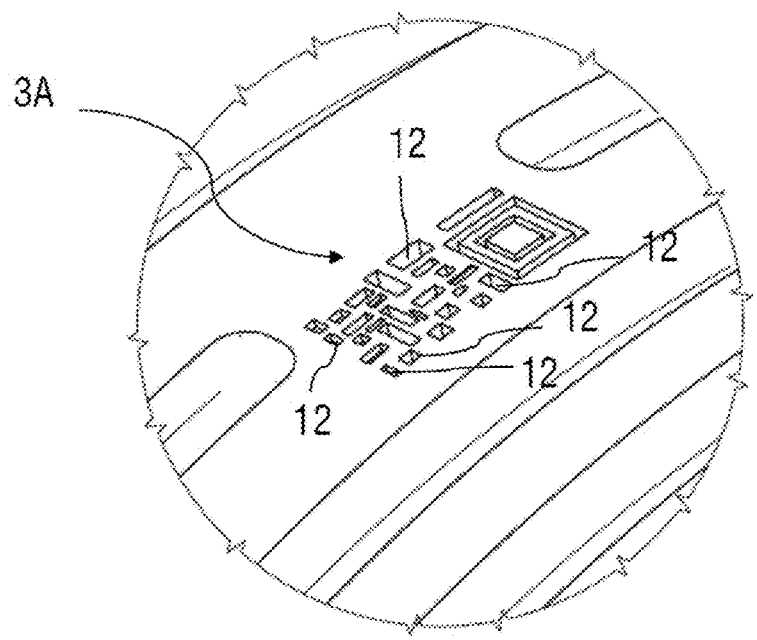
FIG. 2A and FIG. 2B are illustrations showing a shape of the QR® code of FIG. 1 in a first wear condition.
Figure 2B:
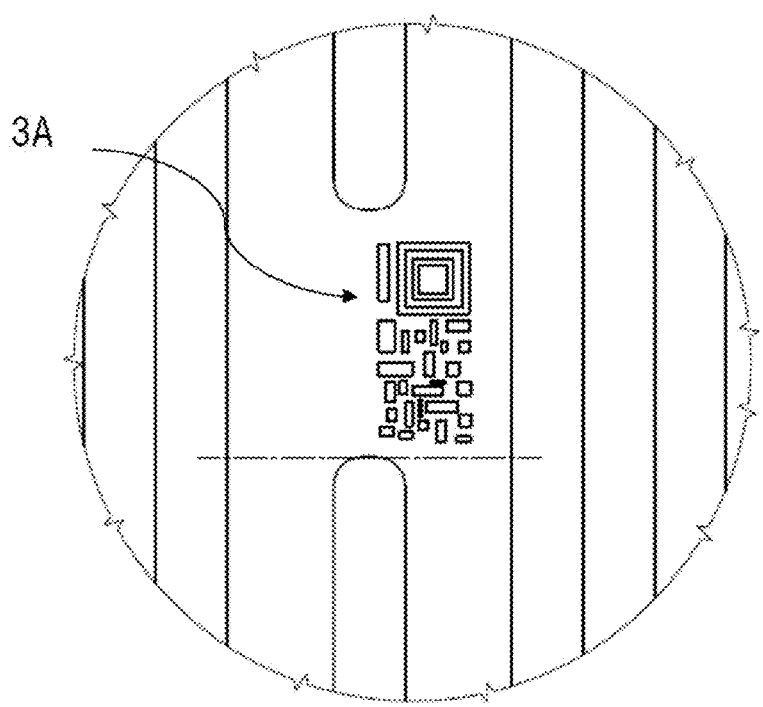

FIG. 2A shows a perspective enlarged view of section A of FIG. 1, and FIG. 2B shows an enlarged plan view of section A of FIG. 1. FIGS. 2A and 2B show in particular the highest level 3A of the QR® code in the new condition of the tire.

The information carriers of the QR® code, i.e. the black points and bars 12 of the QR® code, are formed by tire material. For reasons of simplified illustration and better clarity, only some of the points and bars of the QR® code are designated with the reference character 12.

Each intermediate space between the information carriers 12 is implemented as a pocket. The current shape of the QR® code describes the wear condition of the tire and other information about the tire in a digital manner and can be read, e.g. optoelectronically with a smartphone by its camera.

The QR® code is implemented in a multi-layer form such that individual information carriers (points or bars 12) disappear with increasing wear. The contour of the QR® code thus changes with increasing wear and its information content therefore also changes.

Figure 3A:
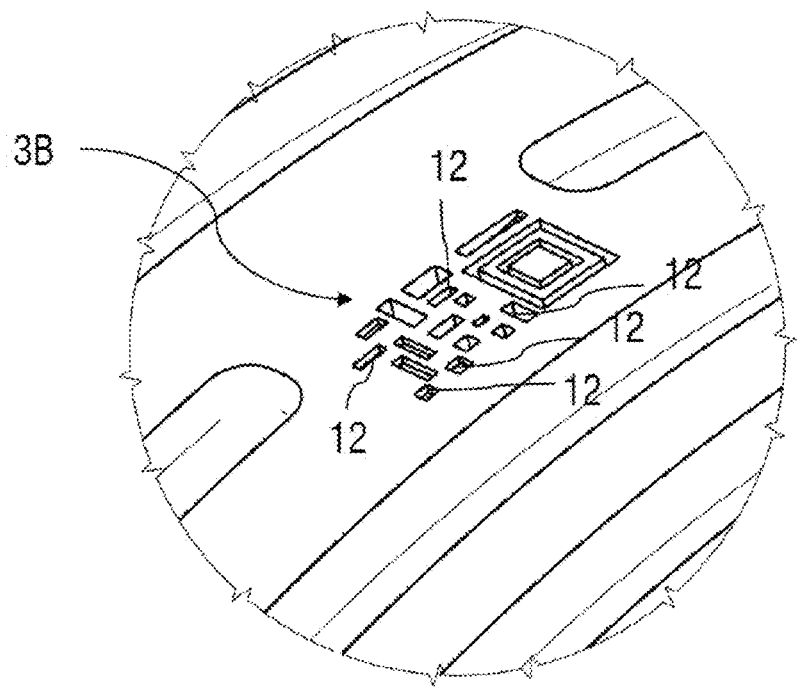
FIG. 3A and FIG. 3B are illustrations showing the shape of the QR® code of FIG. 1 in a second wear condition.
Figure 3B:
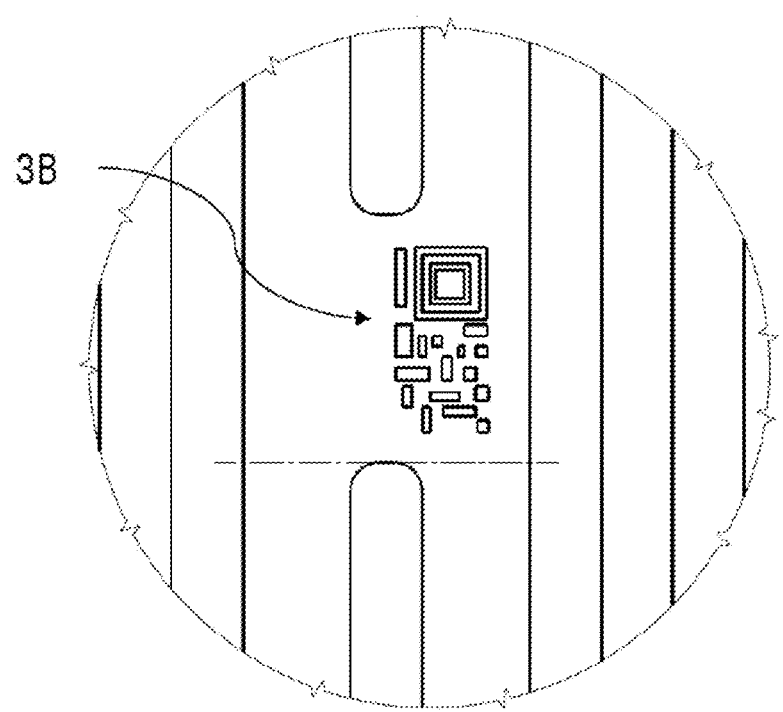

This is illustrated in FIGS. 3A and 3B by way of example, which show section A of FIG. 1 in a state corresponding to greater wear compared to the wear condition illustrated in FIGS. 2A and 2B. FIGS. 3A and 3B thus show a layer 3B of the QR® code that is exposed by wear-induced abrasion of level 3A.

Compared to FIGS. 2A and 2B, the number of points and bars of the QR® code 3B in FIGS. 3A and 3B is reduced. It can thus be concluded from the contour of the QR® code of FIGS. 3A and 3B that there is an increased wear condition.

Figure 4A:
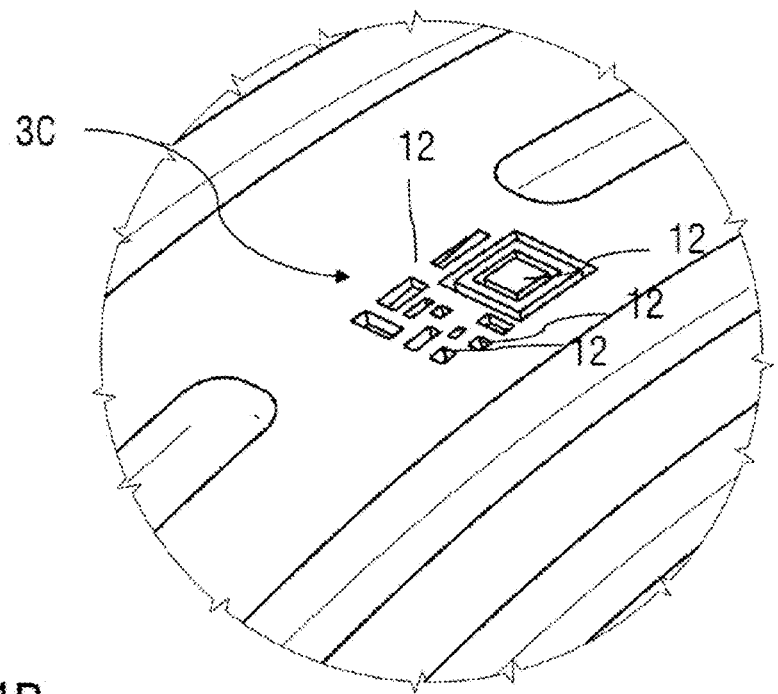
FIG. 4A and FIG. 4B are illustrations showing the shape of the QR® code of FIG. 1 in a third wear condition.
Figure 4B:
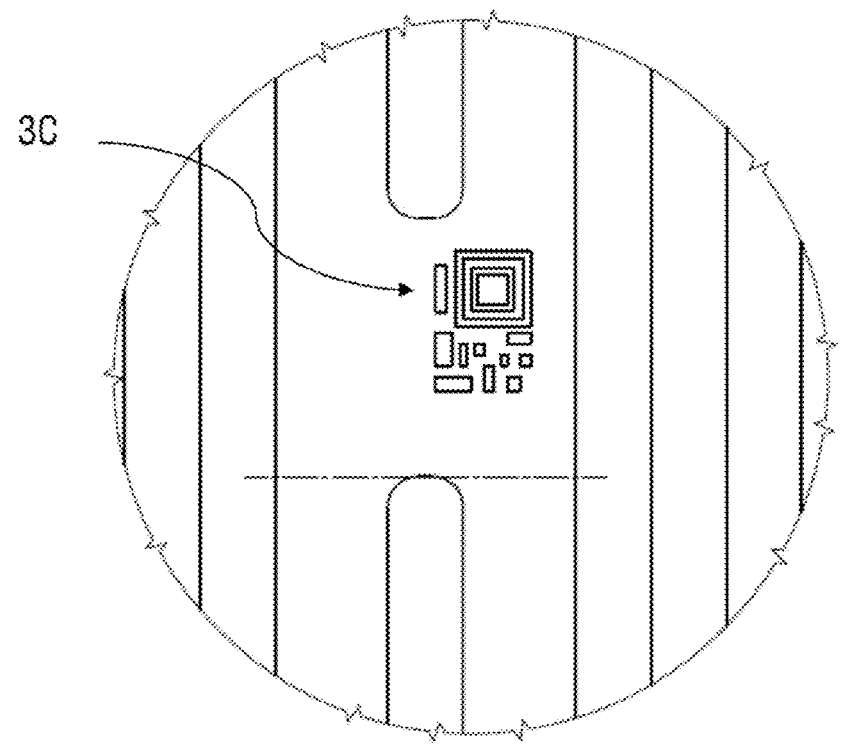

FIGS. 4A and 4B illustrate another state with still greater wear, wherein level 3C of the QR® code is exposed. In the case of QR® code 3C the number of information carriers 12 is further reduced.

The three-dimensional QR® code is implemented here such that the depth in the direction of wear of the individual information carriers (bars and points) is implemented differently. Whereas some information carriers reach all levels of the QR® code and are thus visible in any wear condition, other information carriers can have a smaller depth and so disappear with decreasing wear levels of the wearing part.

In another embodiment version (not illustrated), some of the information carriers are used for encoding wear condition-independent information, such as e.g. the manufacturer or the date of manufacture of the wearing part. The information carriers remain continuously and are visible in all exposed levels of the QR® code.

It has already been explained above that for better detectability of the black points and bars the intermediate space can be filled with a contrast material that corresponds in its wear properties to the tire material and thus wears at exactly the same rate and does not cause any technical degradation of the tire. For example, rubber can be used for this purpose. In principle, the contrast material can still be made fluorescent in order to ensure legibility even in poor light conditions. This is especially necessary in the case of tires that are not steerable and are disposed in narrow wheel housings.

Figure 5A:
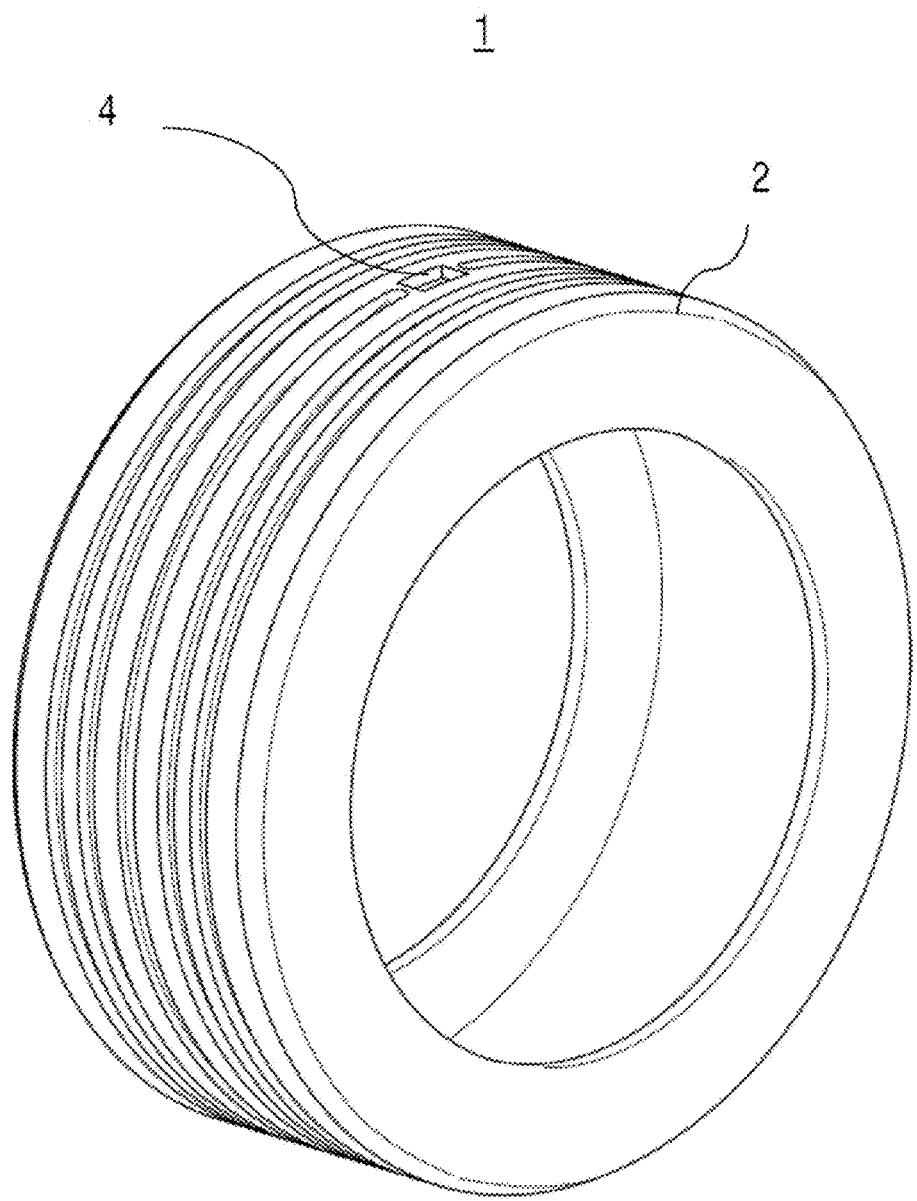
FIG. 5A is a perspective view of the tire with a pocket for introduction of the wear indicator.
Figure 5B:
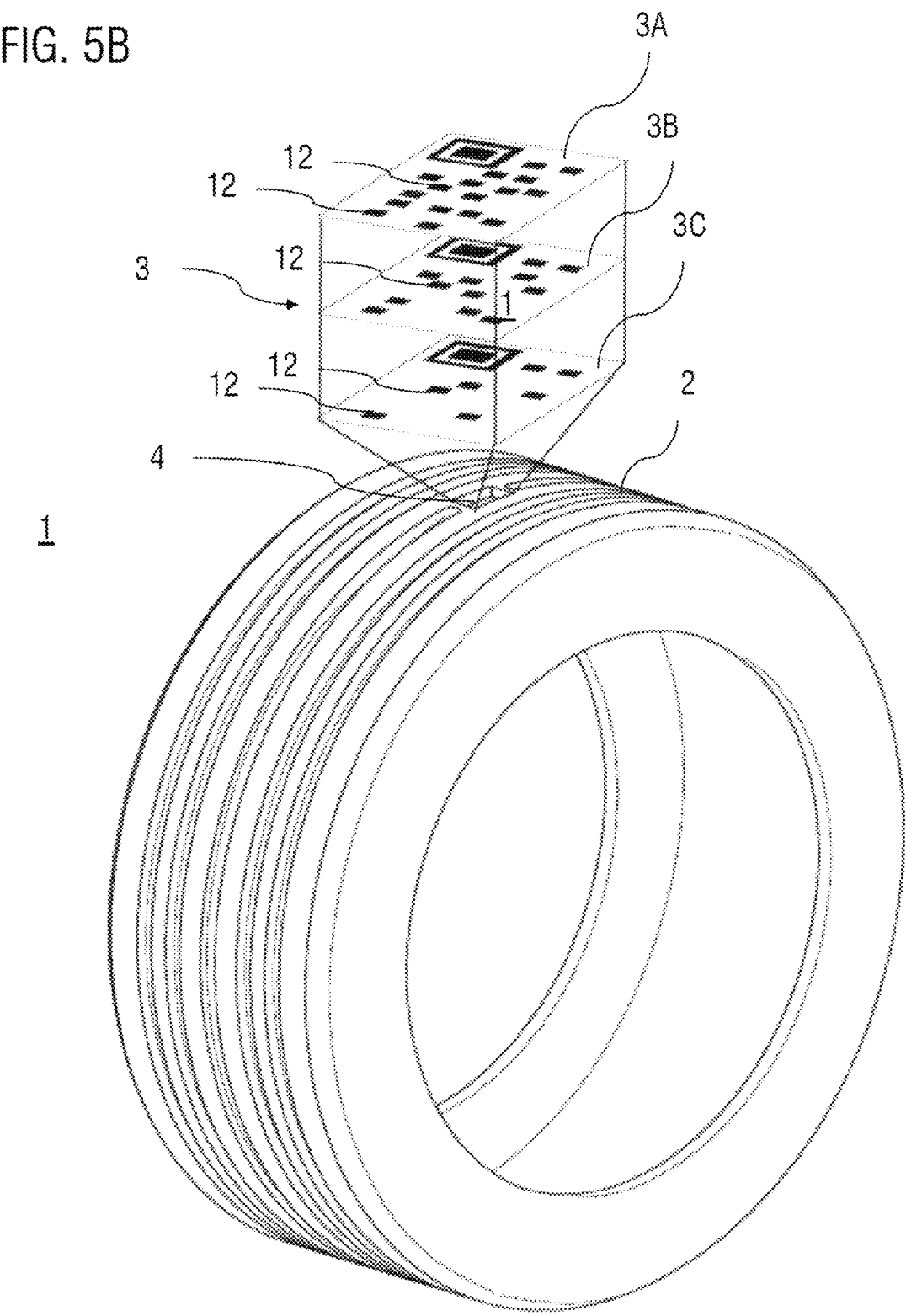
FIG. 5B is an illustration showing schematically a multi-layer structure of the QR® code.

FIGS. 5A and 5B illustrate schematically the introduction of the wear indicator and its multi-layer structure. As illustrated in FIG. 5A, the wear indicator can be inserted into a pocket 4 that is incorporated in the tread of the tire. This especially has the advantage that the wear indicator can be fitted retrospectively and/or manufactured separately.

The wear indicator can thus be produced separately, e.g. by injection moulding, and then filled with a filling material. The filling material has the further advantage that no dirt can collect in the pockets between the information carriers.

FIG. 5B illustrates the multi-layer structure of the wear indicator 3, wherein in the present example to simplify the illustration only three levels 3A, 3B and 3C of the QR® code, which represent the wear-dependent appearance of the wear indicator or QR® code, are shown.

FIG. 5B illustrates that the number of information carriers 12 in the upper levels is larger than in the lower levels.

The wear characteristic can especially be implemented as a single part or even in multiple parts. A multiple part feature can be applied in layers or initially joined together and then applied as a single part. In the case of a multi-layer wearing part, a plurality of levels with QR® codes or barcodes already implemented in black and a contrast color are applied successively. The wearing part can then be introduced into a provided pocket 4 in the tire casing 2.

It is emphasized that the illustration with three levels and three different embodiments of the QR® code is only exemplary and the three-dimensional QR® code or generally the three-dimensional pattern can also contain a different number of different two-dimensional QR® codes or patterns.

FIGS. 6 to 10B illustrate another application of the invention, in the case of which the wear indicator according to the invention is used with a brake disk.

Figure 6:
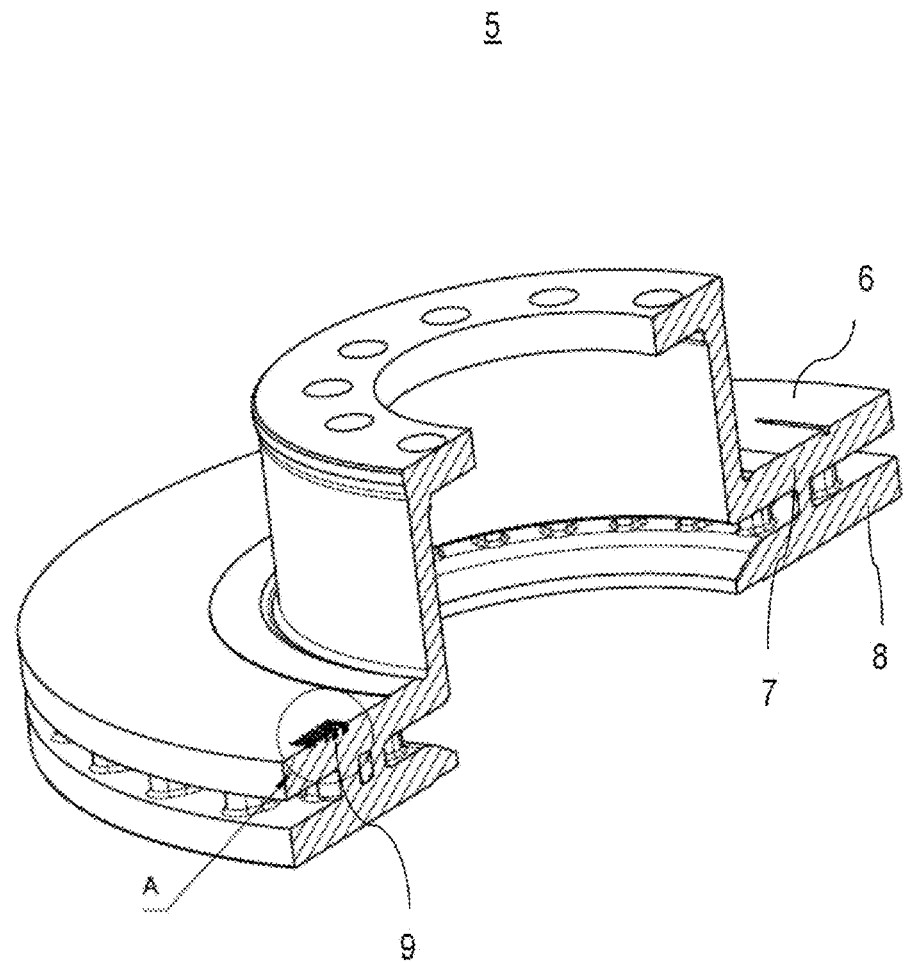
FIG. 6 is a perspective, sectional view of a brake disk with an incorporated QR® code as a wear indicator according to another exemplary embodiment of the invention.

FIG. 6 shows a sectional view of an internally ventilated brake disk 5 with two annular brake disks 7, 8. The wear indicator 9 is incorporated in at least one of the friction surfaces 6.

Figure 7:
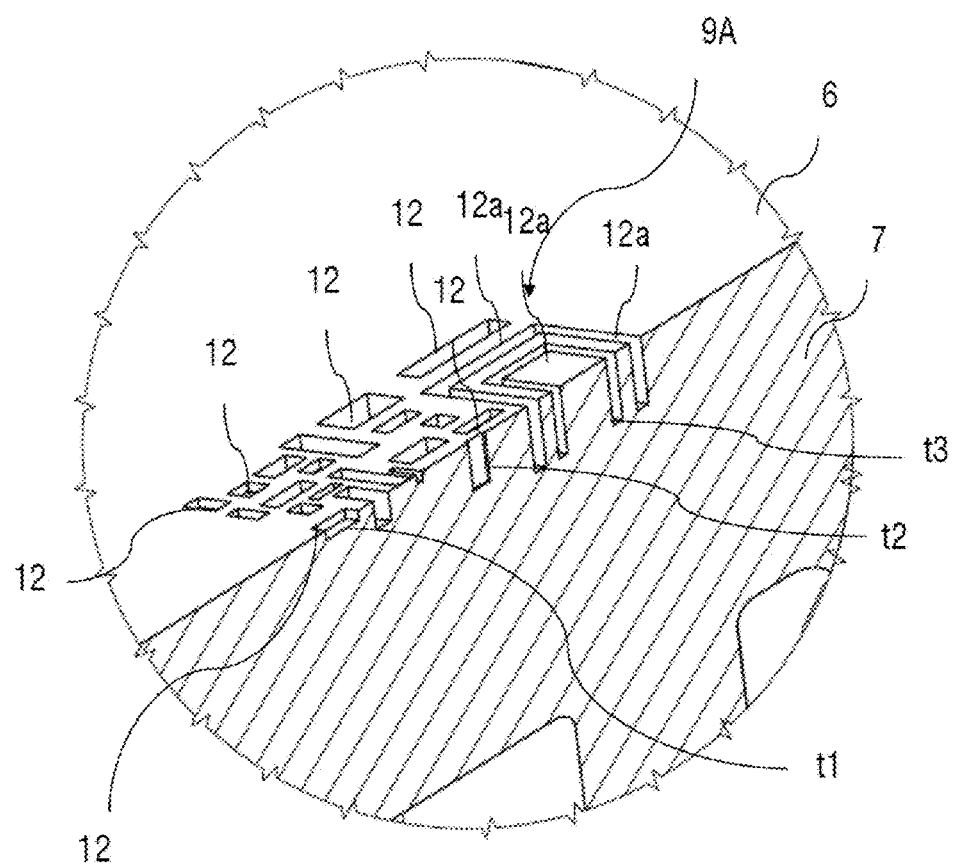
FIG. 7 is an illustration showing the shape of the QR® code in a first wear condition.

FIG. 7 shows an enlarged perspective view of region A of FIG. 6. A three-dimensional structure is incorporated in the friction surface 6, e.g. by drilling or milling, wherein the incorporated depressions are the information carriers 12, 12a of a three-dimensional QR® code 9. In a plan view of the friction surface a two-dimensional level of the QR® code is visible in each case.

For reasons of simplified illustration and better clarity, again only some of the depressions or information carriers of the QR® code are designated with reference characters.

FIG. 7 shows that the individual information carriers 12, 12a extend to different depths in the direction of wear, i.e. perpendicular to the friction surface 6, so that the contour of the QR® code 9 changes depending on the wear condition of the brake disk.

Figure 8:
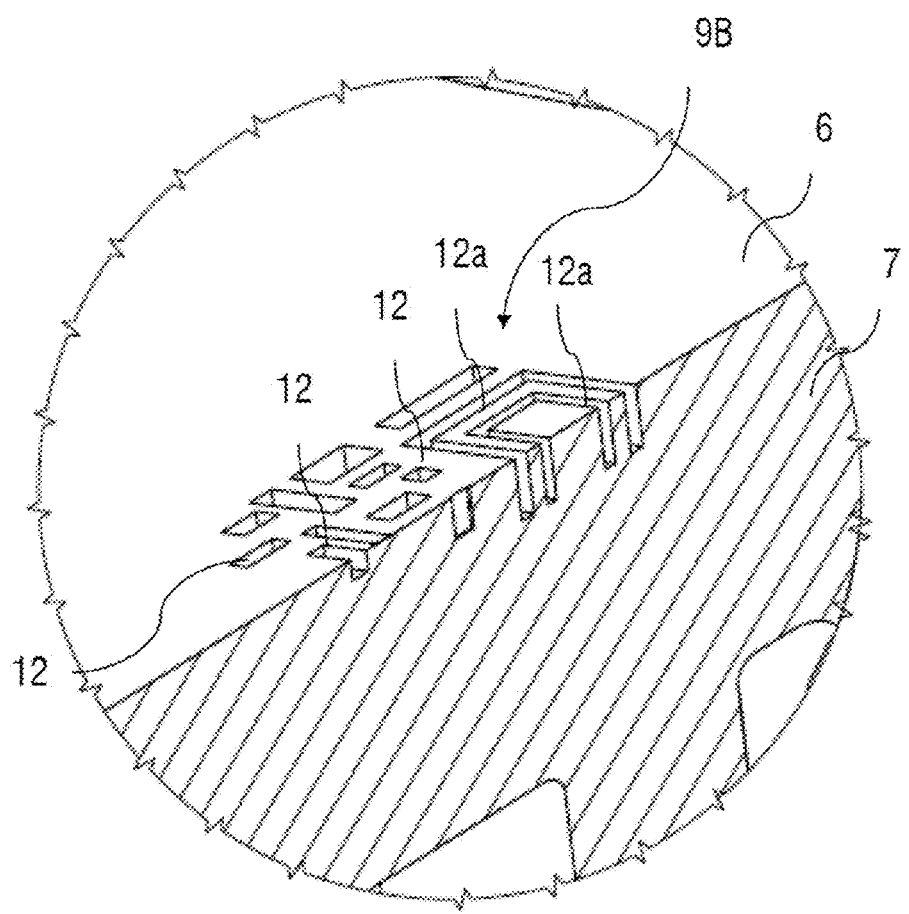
FIG. 8 is an illustration showing the shape of the QR® code in a second wear condition.

FIG. 8 shows a condition of greater wear compared to FIG. 7. Consequently, in the wear condition of FIG. 8 a different level 9B of the QR® code is exposed, because the level 9A above has been worn away as a result of wear.

Layer 9B of the QR® code of FIG. 8 shows fewer information carriers 12 than level 9A of FIG. 7. Because of the changed contour of the exposed level, the information content of the QR® code changes. The contour of level 9B is associated with a condition of greater wear than the contour of level 9A of FIG. 7, which is suitably stored in the end user mobile device, e.g. the smartphone. If the smartphone recognizes the contour of level 9B by photographing the position A of the friction surface 6, the smartphone can determine the corresponding wear condition and display the same to the user.

In the simplified example of FIG. 7, three depths t1, t2 and t3 of the information carriers 12, 12a are illustrated. Thus with increasing wear the information carriers 12 with depth t1, which are no longer visible in FIG. 8, disappear first and then the information carriers 12 with depth t2, which are no longer visible in FIG. 9, disappear. Thus in FIG. 9 only the information carriers 12a with depth t3 are still visible.

Figure 9:
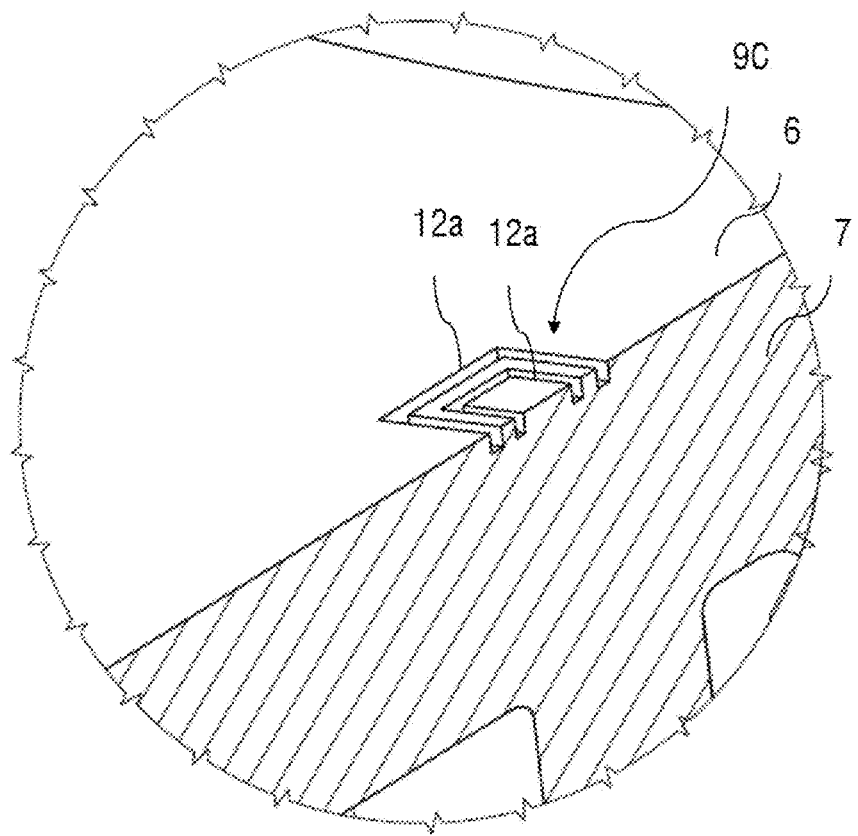
FIG. 9 is an illustration showing the shape of the QR® code in a third wear condition.

The exposed level 9C of the wear condition of FIG. 9 still contains only the elements 12A of the QR® code having the greatest depth. Thus if the brake disk is worn away by wear so much that only the QR® code 9C is still visible, it can be concluded that the brake disk has very great wear and must be replaced.

Figure 10A:
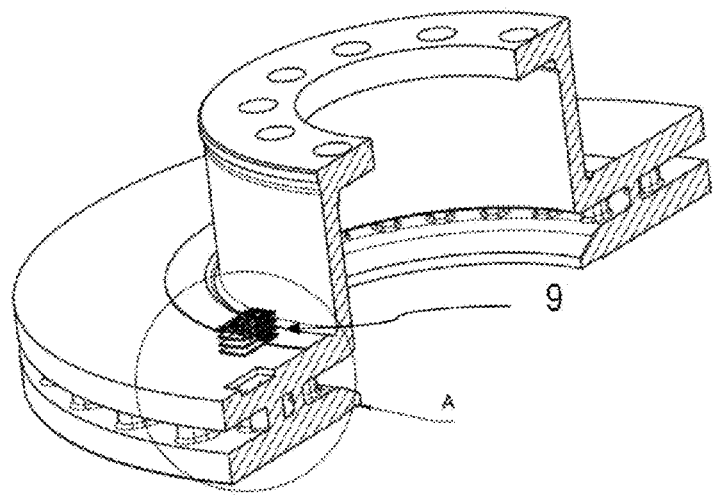
FIG. 10A and FIG. 10B are perspective, sectional views showing a multi-layer structure with the incorporation of the QR® code in a friction surface of the brake disk.
Figure 10B:
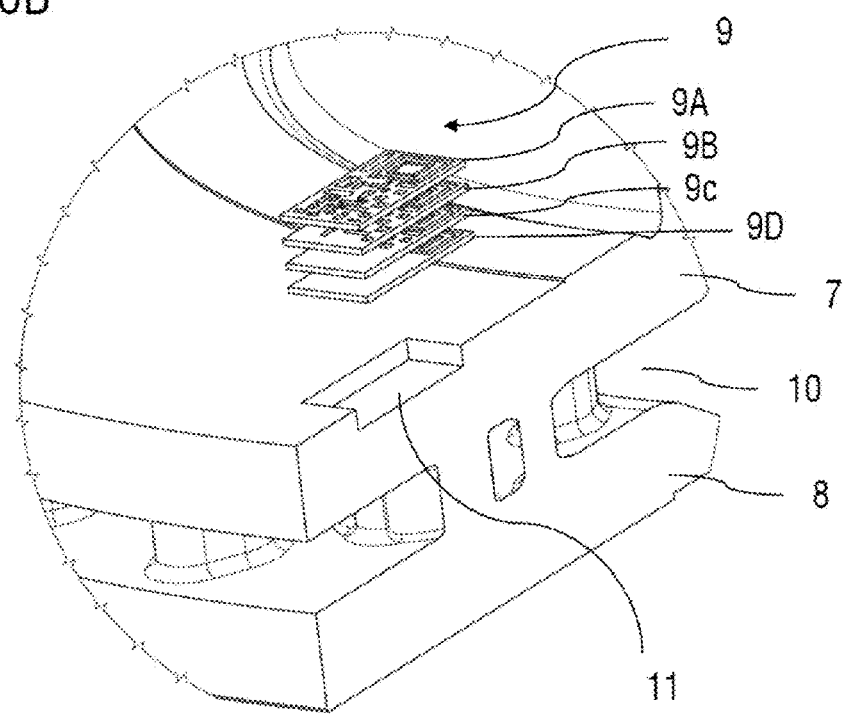

FIGS. 10A and 10B illustrate schematically the multi-layer structure of the wear indicator 9 and the incorporation of the wear indicator 9 in a pocket 11 that is incorporated in the friction surface 6 of the brake disk. The levels 9A, 9B and 9C of the QR® code represent the wear-dependent appearance of the wear indicator or of the QR® code.

In one embodiment of the invention, defined openings 11 such as e.g. pockets or bores can be provided in brake disks, in which the wear indicator in the form of the multi-layer QR® code 9 can subsequently be fixed. This can be carried out by pressing them in, by welding them on or by screwing them in.

The wear indicator itself can be made in a separate process. Possible complex three-dimensional shapes for the representation of a QR® code can thus also be implemented more easily by a layered construction of the wear indicator. Alternatively, reshaping measures can also be used to incorporate the feature.

Furthermore, note that besides the QR® code a barcode can also be used. In addition to the wear-dependent information, such codes can also be used to encode information about the brake disk itself that does not change with wear, e.g. date of manufacture, axle, side of vehicle, unique manufacturer's identification (ID), etc.

Another advantage of the use of QR® codes is the possibility of encoding data in a redundant form, so that by means of a plurality of points measurement inaccuracies caused by impurities or similar can thus also be avoided.

Although the invention has been described with reference to certain exemplary embodiments, a number of versions and variations are possible, which also make use of the ideas of the invention and therefore fall within the protective scope. Consequently, the invention should not be limited to the disclosed defined exemplary embodiments, but the invention should comprise all exemplary embodiments that fall within the scope of the accompanying claims.

The following is a summary list of reference numerals and the corresponding structure used in the above description of the invention:
1 tire
2 treads or tire casing
3 wear indicator, QR® code
3A, 3B, 3C wear-dependent levels of the wear indicator or QR® code
4 insertion pocket
5 brake disk
6 friction surface
7, 8 brake disk rings
9 wear indicator, QR® code
9A, 9B, 9C wear-dependent levels of the wear indicator or QR® code
10 intermediate space for internal ventilation
11 insertion pocket
12, 12A information carriers
t1, t2, t3 depth of the information carriers

The invention claimed is:

1. A wearing part, comprising:
a tire having a tread and formed of a tire material;
a wear indicator incorporated in said tread of said tire and whose appearance changes depending on a wear condition of said tire, said wear indicator having a multidimensional pattern that is disposed on said tire such that different levels of said multidimensional pattern are exposed depending on the wear condition, said different levels of said multidimensional pattern each represent a 2D code, said 2D code having black areas formed by said tire material and an intermediate space between said black areas of the 2D code is implemented as a pocket; and
said wear indicator is retrospectively introduced as a separately manufactured component into said pocket.

2. The wearing part according to claim 1, wherein each exposed level of said multidimensional pattern can be read optoelectronically.

3. The wearing part according to claim 1, wherein said multidimensional pattern changes discretely in a direction of wear.

4. The wearing part according to claim 1, wherein said different levels of said multidimensional pattern contain a one-dimensional or two-dimensional machine-readable code.

5. The wearing part according to claim 1, wherein said wear indicator contains information carriers, and a shape of said code changes in a direction of wear such that at least one of a number, shape, position, or color of said information carriers varies.

6. The wearing part according to claim 1, wherein said multidimensional pattern encodes other wear condition-independent properties of the wearing part.

7. The wearing part according to claim 6, wherein a region of said multidimensional pattern that encodes the wear condition-independent properties of the wearing part does not change in a direction of wear.

8. The wearing part according to claim 1, wherein said intermediate space is provided with a contrast means, wherein a wear property of said contrast means corresponds to a wear property of the tire material.

9. The wearing part according to claim 8, wherein said contrast material is white rubber.

10. The wearing part according to claim 8, wherein said contrast material is implemented in a fluorescent form.

11. The wearing part according to claim 1, wherein each exposed level of said multidimensional pattern encodes data that are indicative of the wear condition.

12. The wearing part according to claim 1, wherein the wearing part is for a vehicle.

13. A wearing part, comprising:
a brake disk having a friction surface and formed of a brake disk material;
a wear indicator incorporated in said brake disk and whose appearance changes depending on a wear condition of said brake disk, said wear indicator having a multidimensional pattern that is disposed on said friction surdace such that different levels of said multidimensional pattern are exposed depending on the wear condition, said different levels of said multidimensional pattern each represent a 2D code, said 2D code having areas formed by said brake disk material and an intermediate space between said areas of the 2D code is implemented as a pocket; and
said wear indicator is retrospectively introduced as a separately manufactured component into said pocket.

14. The wearing part according to claim 13, wherein:
said multidimensional pattern is formed by a plurality of juxtaposed pockets that are incorporated in said friction surface; and
at least one of a number, a shape, or a position of said juxtaposed pockets visible in a plan view of said friction surface changes depending on the wear of said friction surface.

15. A wearing part, comprising:
a tire having a tread and formed from a tire material;
a wear indicator incorporated in said tread of said tire and whose appearance changes depending on a wear condition of said tire, said wear indicator having a multidimensional pattern that is disposed on said tire such that different levels of said multidimensional pattern are exposed depending on the wear condition, said different levels of said multidimensional pattern each represent a 1D code, said 1D code having black bars formed by said tire material and an intermediate space between said black bars of said 1D code is implemented as a pocket; and
said wear indicator is retrospectively introduced as a separately manufactured component into said pocket.

16. A vehicle, comprising:
a wearing part, comprising:
a tire having a tread and formed of a tire material; and
a wear indicator incorporated in said tread of said tire and whose appearance changes depending on a wear condition of said tire, said wear indicator having a multidimensional pattern that is disposed on said tire such that different levels of said multidimensional pattern are exposed depending on the wear condition, said different levels of said multidimensional pattern each represent a 2D code, said 2D code having black areas formed by said tire material and an intermediate space between said black areas of the 2D code is implemented as a pocket; and
said wear indicator is retrospectively introduced as a separately manufactured component into said pocket.

* * * * *